(12) United States Patent
Onodera et al.

(10) Patent No.: US 9,010,673 B2
(45) Date of Patent: Apr. 21, 2015

(54) WIRE ELECTRIC DISCHARGE MACHINING APPARATUS

(75) Inventors: Yasuo Onodera, Chiyoda-ku (JP); Takayuki Nakagawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 13/980,748

(22) PCT Filed: May 16, 2011

(86) PCT No.: PCT/JP2011/061235
§ 371 (c)(1), (2), (4) Date: Jul. 19, 2013

(87) PCT Pub. No.: WO2012/157068
PCT Pub. Date: Nov. 22, 2012

(65) Prior Publication Data
US 2013/0292506 A1 Nov. 7, 2013

(51) Int. Cl.
B65H 59/02 (2006.01)
B23H 7/10 (2006.01)
B23H 7/04 (2006.01)

(52) U.S. Cl.
CPC ... B23H 7/10 (2013.01); B23H 7/04 (2013.01)

(58) Field of Classification Search
USPC ........ 242/413, 413.1, 413.3, 416, 418, 418.1, 242/419, 419.8, 420, 420.5, 420.6; 226/4, 226/11, 43, 100
See application file for complete search history.

(56) References Cited

U.S. PATENT DOCUMENTS

| | | | | |
|---|---|---|---|---|
| 3,648,338 A | * | 3/1972 | Mruk | 28/185 |
| 4,480,799 A | * | 11/1984 | Yano et al. | 242/412 |
| 4,748,310 A | * | 5/1988 | Aso et al. | 219/69.12 |
| 4,786,992 A | * | 11/1988 | Tajima et al. | 242/334.4 |

(Continued)

FOREIGN PATENT DOCUMENTS

| | | |
|---|---|---|
| JP | 02-116421 A | 5/1990 |
| JP | 05-305525 A | 11/1993 |

(Continued)

OTHER PUBLICATIONS

Notice of Rejection of JP Application No. 2011-541424 dated Nov. 30, 2011, English Translation.

(Continued)

*Primary Examiner* — William A Rivera
(74) *Attorney, Agent, or Firm* — Sughrue Mion, PLLC; Richard C. Turner

(57) ABSTRACT

A wire electric discharge machining apparatus according to embodiments includes a wire electrode, a wire supplying unit that supplies the wire electrode, a collecting motor that collects the wire electrode at a predetermined speed, a tension motor that controls a tension of the wire electrode between the wire supplying unit and the collecting motor, a speed calculating unit that calculates a traveling speed of the wire electrode at a predetermined time interval, a speed storing unit that stores the traveling speed calculated by the speed calculating unit, a differential speed calculating unit that calculates a differential speed between a current traveling speed output from the speed calculating unit and a past traveling speed stored in the speed storing unit, and a breakage detecting unit that detects breakage of the wire electrode by comparing the differential speed with a predetermined threshold.

4 Claims, 5 Drawing Sheets

(56) References Cited

U.S. PATENT DOCUMENTS

| | | | | |
|---|---|---|---|---|
| 5,810,235 | A | * | 9/1998 | Hoynant et al. ............... 226/100 |
| 2004/0118892 | A1 | * | 6/2004 | Weber et al. ..................... 226/44 |
| 2008/0283653 | A1 | * | 11/2008 | Bing-Wo et al. .............. 242/410 |

FOREIGN PATENT DOCUMENTS

| JP | 05-305528 A | 11/1993 |
|---|---|---|
| JP | 2599290 B2 | 4/1997 |
| JP | 10-309631 A | 11/1998 |
| JP | 2001-252829 A | 9/2001 |

OTHER PUBLICATIONS

International Search Report of PCT/JP2011/061235 dated Jun. 7, 2011, English Translation.

* cited by examiner

WIRE ELECTRIC DISCHARGE MACHINING APPARATUS

CROSS REFERENCE TO RELATED APPLICATIONS

This is a National Stage of International Application No. PCT/JP2011/061235 filed May 16, 2011, the content of all of which is incorporated herein by reference in its entirety.

FIELD

The present invention relates to a wire electric discharge machining apparatus capable of detecting breakage of a wire electrode.

BACKGROUND

In wire electric discharge machining apparatuses, the machining conditions are adjusted such that the machining energy is increased as much as possible to improve the machining speed. However, when the machining energy is increased, the wire electrode becomes easy to break. Moreover, when a workpiece is machined into a shape that tends to make machining unstable, the wire becomes easy to break. In addition, for example, aging of the components of the wire traveling system causes the wire to travel unstably, which causes the wire to be easily broken. In other words, wire breakage is almost inevitable in wire electric discharge machining apparatuses.

If wire breakage is not detected fast and accurately and the machining power source and wire traveling are not stopped, electric discharge occurs at places other than at the workpiece, which is very dangerous. Consequently, a breakage detecting unit is indispensable for wire electric discharge machining apparatuses.

Methods have been used in which a limit switch, optical sensor, tension sensor or the like is provided on the wire traveling path as a breakage detecting unit. Moreover, a method is disclosed in Patent Literature 1 in which wire breakage is detected by using the rotational speed difference between the rotational components at two locations that are arranged on the wire traveling path. It is described that, with this method, breakage can be detected without causing a malfunction by detecting the rotational speed at any two of the wire supplying bobbin on which the wire electrode is wound, the tension roller that applies tension to the wire electrode paid out from the bobbin, the collecting roller that causes the wire electrode to travel at a predetermined speed, and the guide pulley that stabilizes the wire electrode as it travels and changes the traveling direction, and then, when the rotational speed difference between the two locations exceeds a predetermined threshold, determining that breakage has occurred.

CITATION LIST

Patent Literature

Patent Literature 1: Japanese Patent No. 2599290

SUMMARY

Technical Problem

However, in the conventional technology described above, for example, with the breakage detecting method described in Patent Literature 1, when the wire starts or stops traveling or when the wire traveling speed changes, although the wire is not broken, a rotational speed difference may occur between the wire traveling components at two locations and a false detection of breakage may occur.

Moreover, if the diameters of the wire electrodes are equal, the speed difference between the collecting roller and the tension roller while the wire is traveling increases as the set wire tension increases. Furthermore, if the set wire tension is the same, the speed difference between the collecting roller and the tension roller while the wire is traveling increases as the wire electrode becomes easier to expand, which depends on the wire electrode diameter or the material. Therefore, while the wire is traveling, a speed difference occurs between the rotational components in the wire traveling system due to the expansion of the wire electrode. Thus, although the wire is not broken, a false detection of breakage may occur.

Furthermore, when control is applied such that the rotational speed variation of the tension roller is suppressed to suppress the tension variation of the wire electrode, the tension motor functions to maintain the rotational speed even after the wire is broken. Therefore, there has been a problem in that a speed difference does not occur between the rotational components at two locations on the wire traveling path and thus wire breakage cannot be detected or it takes a long time until a rotational speed difference occurs and thus detection of wire breakage is delayed.

The present invention is achieved in view of the above and has an object to obtain a wire electric discharge machining apparatus that can appropriately detect wire breakage without a false detection even when the wire traveling speed changes transiently or when a speed difference occurs between rotational components of the wire traveling system.

Solution to Problem

In order to solve the above problems and achieve the object, the present invention includes a wire electrode, a wire supplying unit that supplies the wire electrode, a collecting motor that collects the wire electrode at a predetermined speed, a tension motor that controls a tension of the wire electrode between the wire supplying unit and the collecting motor, a speed calculating unit that calculates a traveling speed of the wire electrode at a predetermined time interval, a speed storing unit that stores the traveling speed calculated by the speed calculating unit, a differential speed calculating unit that calculates a differential speed between a current traveling speed output from the speed calculating unit and a past traveling speed stored in the speed storing unit, and a breakage detecting unit that detects breakage of the wire electrode by comparing the differential speed with a predetermined threshold.

Advantageous Effects of Invention

According to this invention, an effect can be obtained where a false detection of wire breakage does not occur even when the wire traveling speed changes transiently or when a speed difference occurs between the rotational components of the wire traveling system and thus wire breakage can be immediately detected even when control to suppress the speed variation of the tension motor is applied.

DESCRIPTION OF EMBODIMENTS

Embodiments of a wire electric discharge machining apparatus according to the present invention will be described in detail below with reference to the drawings. This invention is not limited to the embodiments.

First Embodiment.

Figure 1:
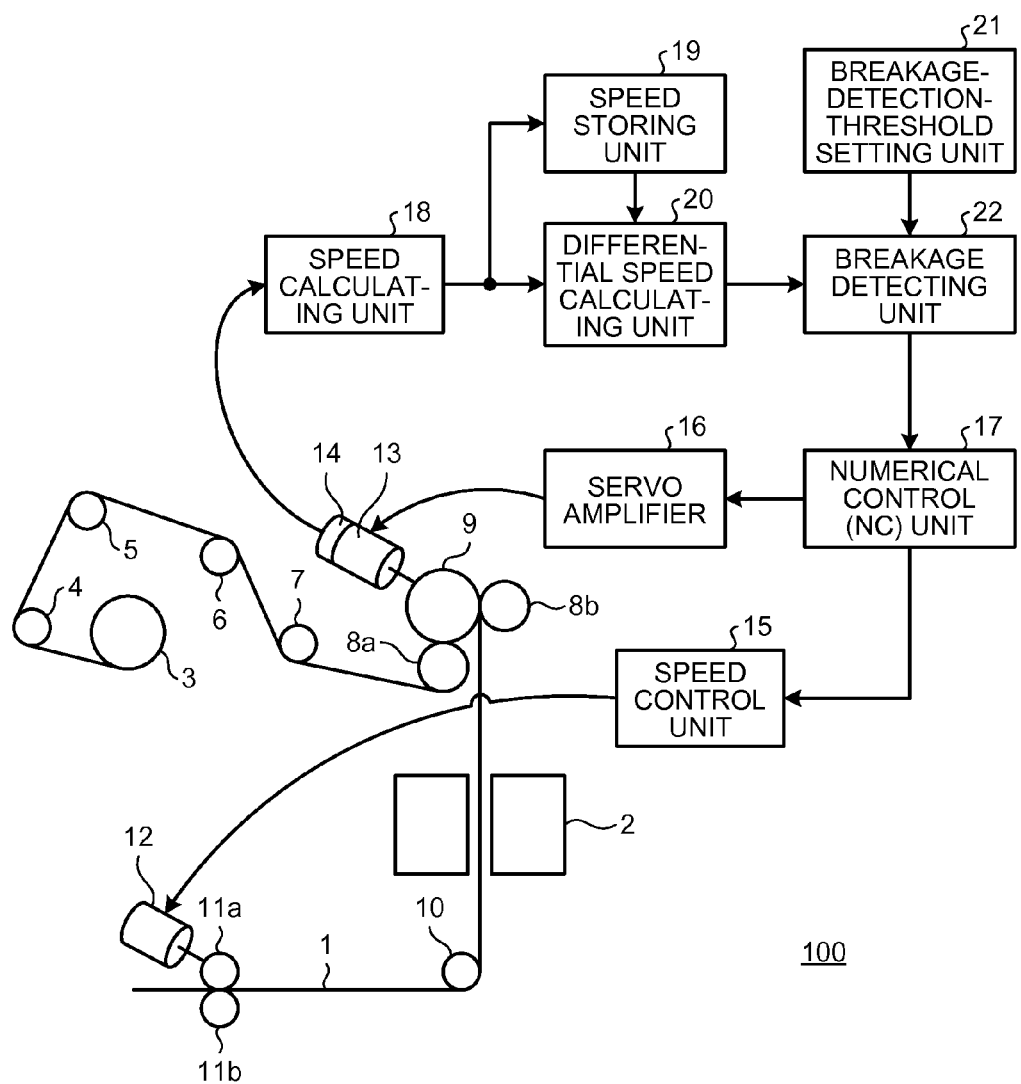
FIG. 1 is a diagram illustrating the configuration of a wire electric discharge machining apparatus according to a first embodiment of the present invention.

FIG. 1 is a diagram illustrating the overall configuration of a wire electric discharge machining apparatus 100 according to the first embodiment of the present invention. The wire electric discharge machining apparatus 100 includes a wire electrode 1, a wire bobbin 3 (wire supplying unit) that supplies the wire electrode 1, wire guide rollers 4, 5, 6, 7, and 10 that are arranged on the path along which the wire electrode 1 travels, collecting rollers 11a and 11b that collect the wire electrode 1 at a predetermined speed, a collecting motor 12 that drives the collecting roller 11a, a speed control unit 15 that controls the rotational speed of the collecting motor 12, a tension roller 9 and pinch rollers 8a and 8b that apply tension to the wire electrode 1, a tension motor 13 that drives the tension roller 9, an encoder 14 that is attached to the tension motor 13, a servo amplifier 16 that controls the tension motor 13, and a numerical control (NC) unit 17 that controls the speed control unit 15 and the servo amplifier 16 at an upper level.

Furthermore, the wire electric discharge machining apparatus 100 according to the present embodiment includes a speed calculating unit 18 that calculates the rotational speed, i.e., the traveling speed of the wire electrode 1, by using the signal of the encoder 14 attached to the tension motor 13, a speed storing unit 19 that stores the speed calculated by the speed calculating unit 18, a differential speed calculating unit 20 that calculates the differential speed by using the current speed output from the speed calculating unit 18 and the past sample speed output from the speed storing unit 19, a breakage-detection-threshold setting unit 21 that sets the breakage detection threshold, and a breakage detecting unit 22 that detects breakage of the wire electrode 1 by comparing the breakage detection threshold set by the breakage-detection-threshold setting unit 21 with the differential speed output from the differential speed calculating unit 20.

Next, the wire electric discharge machining apparatus 100 according to the first embodiment will be explained with reference to FIG. 1. The wire electrode 1 is paid out such that it faces a workpiece 2 while being controlled so as to have a predetermined tension and traveling speed. At this point, a pulse voltage is applied to the wire electrode 1 from a machining power source (not illustrated) and the relative distance between the wire electrode 1 and the workpiece 2 is appropriately controlled by a driving device (not illustrated), whereby discharge sparks are generated successively between the wire electrode 1 and the workpiece 2 and machining proceeds.

The traveling speed and tension of the wire electrode 1 are controlled as follows. The wire electrode 1 comes off the wire bobbin 3, passes the wire guide rollers 4, 5, 6, 7, and 10, and is collected by the collecting rollers 11a and 11b. Various forms can be considered for the number of guide rollers and the arrangement thereof. The collecting rollers 11a and 11b are driven by the collecting motor 12. The traveling speed of the wire electrode 1 is determined by the machining conditions. The numerical control unit 17 sends a speed command to the speed control unit 15 and the speed control unit 15 controls the speed of the collecting motor 12.

Moreover, the wire electrode 1 is held by the pinch rollers 8a and 8b so that the wire electrode 1 does not slide on the tension roller 9, and the torque generated by the tension motor 13 is transmitted to the wire electrode 1 via the tension roller 9. The tension of the wire electrode 1 is determined depending on the machining conditions. A tension command is sent to the servo amplifier 16 from the numerical control unit 17 and the servo amplifier 16 controls the torque of the tension motor 13 such that a predetermined tension is obtained. In some cases, such as a case where automatic wire threading or cutting of the wire electrode 1 is performed, the speed of the tension motor 13 is controlled; therefore, the encoder 14 is generally attached to the tension motor 13 and the speed of the tension motor 13 is controlled by the servo amplifier 16 in some cases.

The principle of the wire breakage detecting method according to the present embodiment will be explained here. The machining wire electrode 1 is collected at a constant speed by the collecting rollers 11a and 11b in a state of being tensioned between the tension roller 9 and the collecting rollers 11a and 11b. When wire breakage occurs, the wire electrode 1 on the side of the collecting rollers 11a and 11b with respect to the breakage point is collected at a constant speed by the collecting rollers 11a and 11b; however, the wire electrode 1 on the side of the tension roller 9 with respect to the breakage point is not collected by the collecting rollers. Therefore, the wire traveling speed decreases. Furthermore, whereas the wire electrode 1 before being broken is supported by the collecting rollers 11a and 11b, the broken wire electrode 1 on the side of the tension roller 9 with respect to the breakage point becomes such that the breakage point becomes a free end. Thus, a rapid deceleration occurs immediately after the wire is broken.

Figure 2:
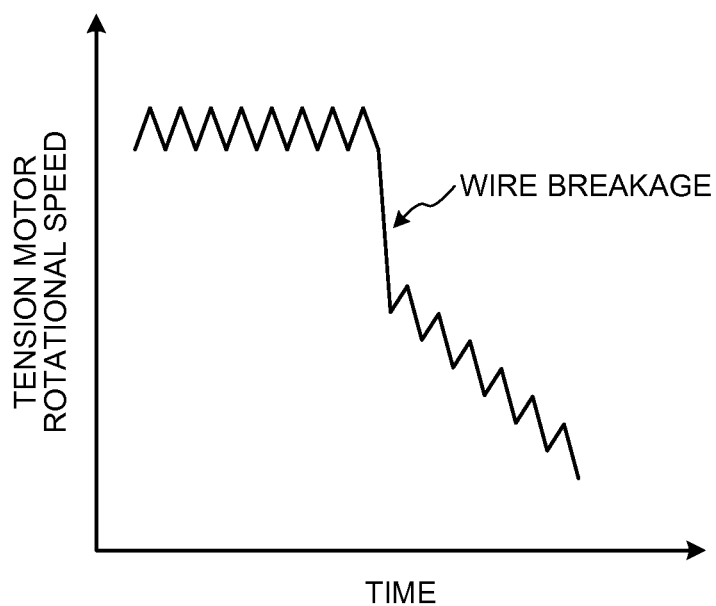
FIG. 2 is a diagram illustrating the change over time of the rotational speed of a tension motor between before and after breakage of a wire.

This rapid deceleration also becomes apparent in the rotational speed of the tension motor 13 as illustrated in FIG. 2. FIG. 2 is a diagram illustrating the change over time of the rotational speed (tension motor rotational speed) of the tension motor 13. Wire breakage can be detected by focusing attention on the rapid deceleration of the tension motor rotational speed. The rapid deceleration occurs at the same time as wire breakage; therefore, in the breakage detecting method that focuses attention on the rapid deceleration, wire breakage can be immediately detected.

The rapid deceleration of the tension motor rotational speed depends on whether both ends of the wire electrode 1 are supported. In contrast, the rotational speed pulsates in some cases when the rotational speed of the tension motor 13 changes transiently, such as when the wire starts to travel, the wire is stopped, or the wire traveling speed is changed; however, because both ends of the wire electrode 1 are still supported, the rapid deceleration of the rotational speed does not occur. Therefore, in the breakage detecting method that focuses attention on the rapid deceleration of the rotational speed, a false detection does not occur even while the tension motor rotational speed changes transiently.

An explanation will be specifically given below of a method of detecting breakage by focusing attention on the rapid deceleration of the tension motor. The encoder 14 measures the amount of rotation of the tension motor 13 while the wire is traveling, and the speed calculating unit 18 converts the amount of rotation measured by the encoder 14 to a rotational speed and sends it to the speed storing unit 19 and the differential speed calculating unit 20. The differential speed calculating unit 20 calculates the differential speed by using the tension motor rotational speeds of the current sample and the last sample and sends it to the breakage detecting unit 22.

The differential speed amount, which is used to detect wire breakage, is set in the breakage detecting unit 22 as a breakage detection threshold by the breakage-detection-threshold setting unit 21. When the differential speed amount of the tension motor rotational speed exceeds the set breakage detection threshold, the breakage detecting unit 22 determines that wire breakage has occurred and sends a breakage detection signal to the numerical control unit 17. When the numerical control unit 17 receives the breakage detection signal, the numerical control unit 17 sends a command to the servo amplifier 16 to stop the rotation of the tension motor 13. Moreover, the numerical control unit 17 sends the stop command also to a machining power source (not illustrated) and a driving device (not illustrated) that controls the relative distance between the wire electrode 1 and the workpiece 2.

Figure 3:
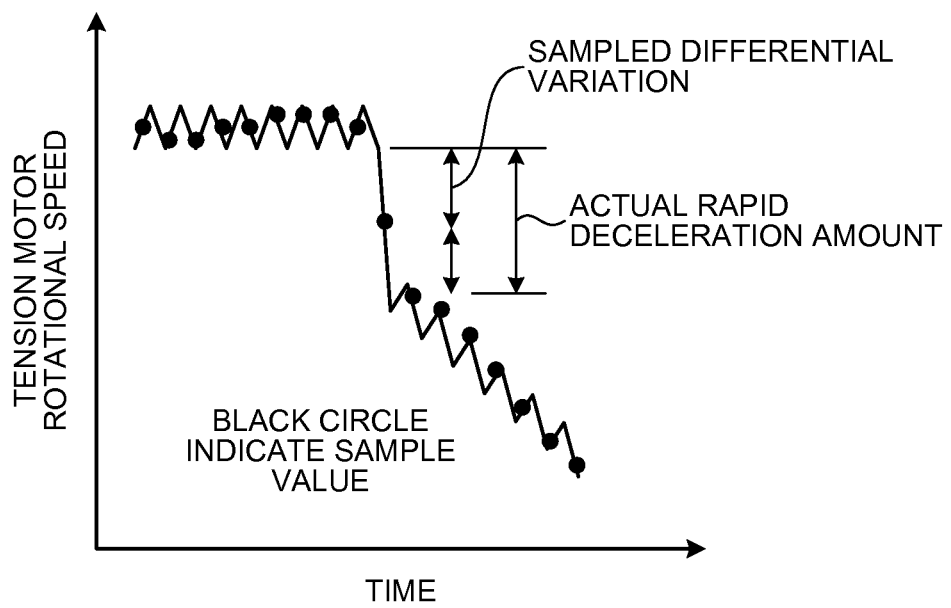
FIG. 3 is a diagram illustrating a state where, when the rotational speed of the tension motor is sampled before and after wire breakage, the rapid deceleration amount between before and after wire breakage is small when sampled depending on the sampling timing.

For implementing the breakage detecting method in the present embodiment, it is preferable that the sample speed sent to the differential speed calculating unit 20 from the speed storing unit 19 be a sample speed that is taken two or more samples before the current sample. The rapid deceleration of the speed between before and after wire breakage is a phenomenon that occurs in a very short time. However, the rapid deceleration amount immediately after wire breakage may, depending on the timing of the speed sampling, be small when sampled as illustrated in the example in FIG. 3. Therefore, the differential speed is calculated by using the current sample speed and a sample speed that is taken two or more samples before the current sample speed, whereby the rapid deceleration amount is prevented from being smaller than the actual variation when sampled.

Second Embodiment.

Figure 4:
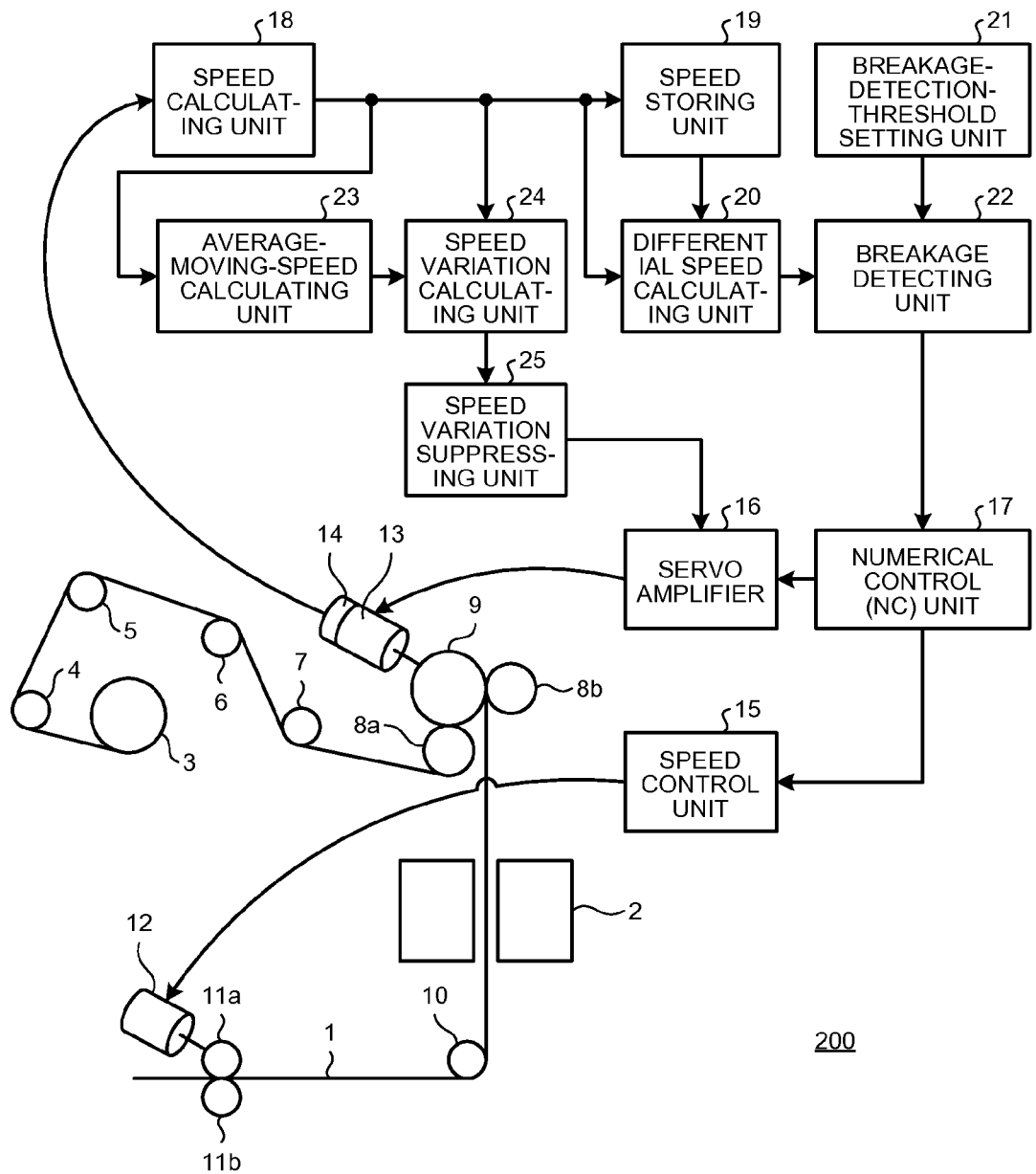
FIG. 4 is a diagram illustrating the configuration of a wire electric discharge machining apparatus according to a second embodiment of the present invention.

FIG. 4 is a diagram illustrating the overall configuration of a wire electric discharge machining apparatus 200 according to the second embodiment of the present invention. Further effects can be obtained with the breakage detecting method by using the wire electric discharge machining apparatus 200 in the present embodiment. The configuration of the wire electric discharge machining apparatus 200 in FIG. 4 is such that an average-moving-speed calculating unit 23, a speed variation calculating unit 24, and a speed variation suppressing unit 25 are added to the configuration of the wire electric discharge machining apparatus 100 in FIG. 1. The functions and operations of other components in FIG. 4 are similar to those explained in FIG. 1 in the first embodiment and therefore an explanation thereof is omitted.

In FIG. 4, the average-moving-speed calculating unit 23 calculates the average moving speed by using the rotational speed of the tension motor 13 calculated by the speed calculating unit 18 and sends it to the speed variation calculating unit 24. The speed variation calculating unit 24 calculates the speed variation (AC component of the speed) of the tension motor 13 by using the difference between the rotational speed of the tension motor 13 provided by the speed calculating unit 18 and the average moving speed provided by the average-moving-speed calculating unit 23 and sends the speed variation to the speed variation suppressing unit 25. The speed variation suppressing unit 25 sends a control command to the servo amplifier 16 to suppress the speed variation of the tension motor 13 and the servo amplifier 16 controls the tension motor 13 such that the speed variation is suppressed in addition to controlling the torque.

Figure 5:
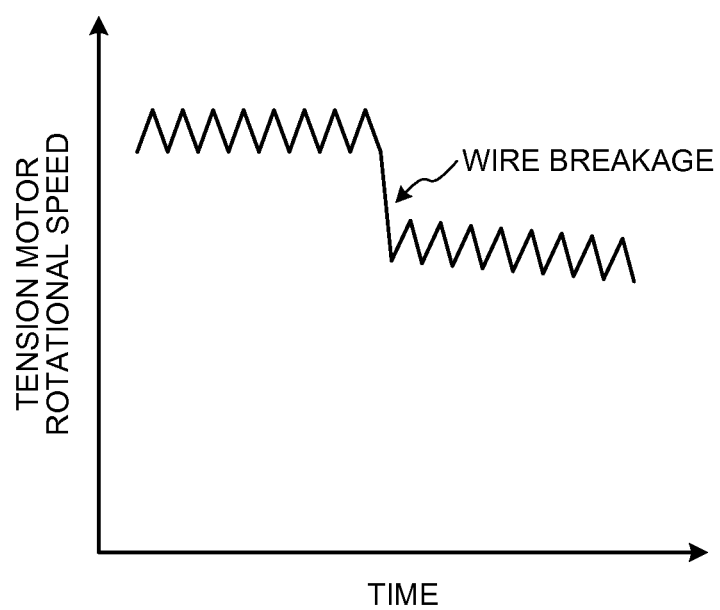
FIG. 5 is a diagram illustrating the change over time of the rotational speed of a tension motor before and after wire breakage when the wire is broken while speed variation control of the tension motor is applied.

The tension variation that occurs in the wire electrode 1 can be suppressed by suppressing the speed variation of the tension motor 13; however, even after wire breakage, the tension motor 13 tends to maintain the speed it had before wire breakage due to suppression of the speed variation of the tension motor 13. Therefore, there is a problem in that a speed difference does not occur between the rotational components at two locations on the wire traveling path and thus wire breakage cannot be detected or it takes a long time until a rotational speed difference occurs and thus detection of wire breakage is delayed. In contrast, because the rotational speed of the tension motor 13 decreases rapidly at the moment when the wire is broken as illustrated in FIG. 5, breakage can be immediately detected by using the differential speed of the tension motor 13.

Third Embodiment.

Figure 6:
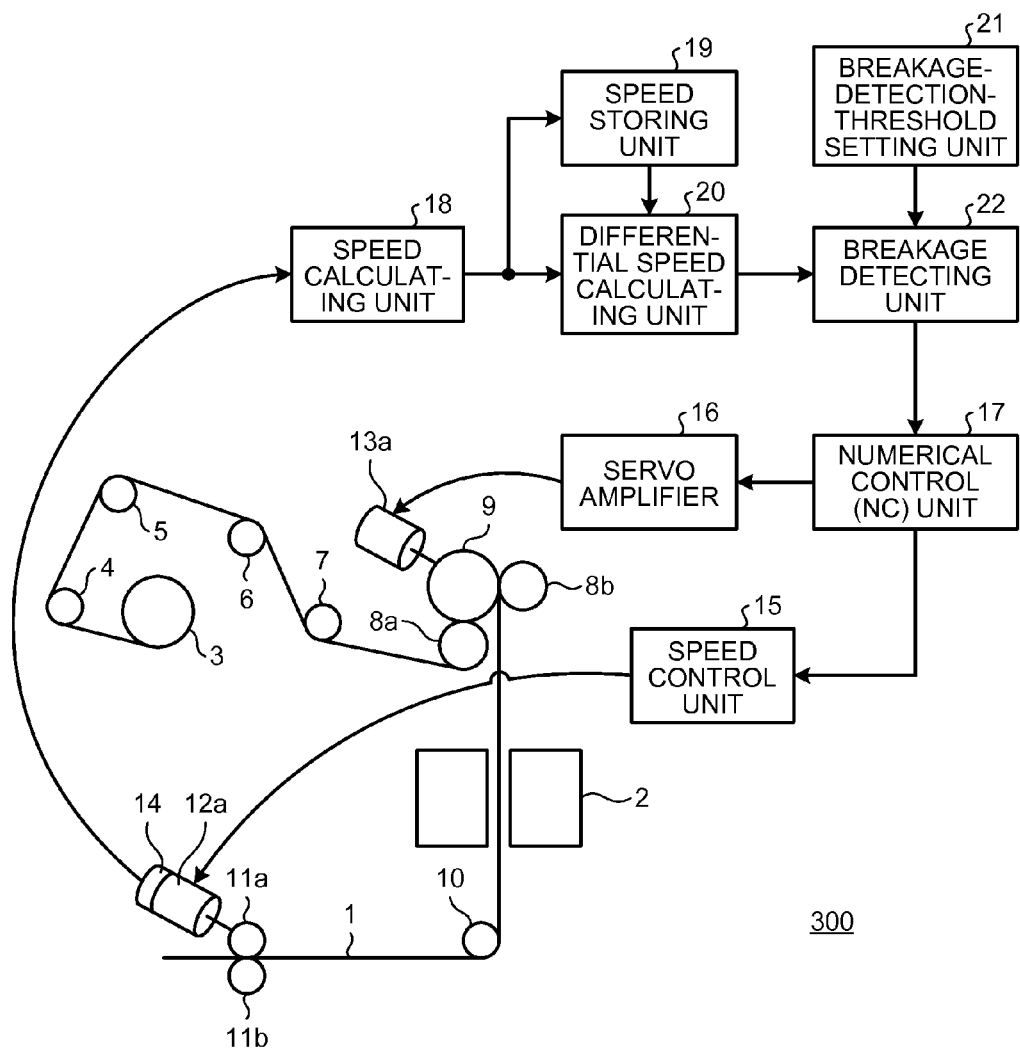
FIG. 6 is a diagram illustrating the configuration of a wire electric discharge machining apparatus according to a third embodiment of the present invention.

FIG. 6 is a diagram illustrating the overall configuration of a wire electric discharge machining apparatus 300 according to the third embodiment of the present invention. In the first embodiment, an explanation is given of a case where the speed of the collecting motor 12 is controlled by the speed control unit 15; however, in the third embodiment, the configuration is such that the collecting motor 12 in FIG. 1 is replaced by a collecting motor 12a, whose torque is controlled, as illustrated in FIG. 6 and the tension motor 13 in FIG. 1 is replaced by a servo motor 13a, whose speed is controlled, illustrated in FIG. 6.

In other words, the speed control unit 15 controls the torque of the collecting motor 12a and the servo amplifier 16 controls the speed of the servo motor 13a. In the present embodiment, the encoder 14 is attached to the collecting motor 12a and the encoder 14 measures the amount of rotation of the collecting motor 12a. The speed calculating unit 18 converts the amount of rotation measured by the encoder 14 to a rotational speed and sends it to the speed storing unit 19 and the differential speed calculating unit 20. Other components and operations are similar to those in the first embodiment. In the wire electric discharge machining apparatus 300 in the present embodiment, it is also possible to perform a breakage detecting method that provides effects similar to those in the embodiment described above.

When the wire is broken in the wire electric discharge machining apparatus 300 in the present embodiment, the wire electrode 1 on the side of the collecting rollers 11a and 11b with respect to the breakage point becomes such that the breakage point becomes a free end. Because the tension of the collecting motor 12a is controlled, the collecting motor 12a suddenly accelerates in the direction in which the wire electrode 1 is collected. Thus, wire breakage can be detected by detecting the rapid acceleration of the collecting motor 12a.

The collecting motor 12a in FIG. 6 is also a motor that controls the tension of the wire electrode 1. In other words, the collecting motor 12a can be referred to as a tension motor. Thus, in all the configurations in the first embodiment (FIG. 1), second embodiment (FIG. 4), and third embodiment (FIG. 6), wire breakage is detected by using the rapid speed variation of the tension motor.

As described above, according to the configurations of the wire electric discharge machining apparatuses in the first to third embodiments in the present invention, even when the rotational speed of the tension motor 13 (the collecting motor 12a) changes transiently, such as when the wire starts to travel, the wire is stopped, or the wire traveling speed is changed, a false detection of breakage does not occur. Moreover, even when a speed difference occurs between the rotational components of the wire traveling system while the wire is traveling due to the expansion of the wire electrode 1, a false detection of breakage does not occur. Furthermore, in the second embodiment, breakage can be detected even when control to suppress the speed variation of the tension motor 13 is applied. Then, because a rapid speed change is detected at the same time as wire breakage, wire breakage can be immediately detected.

Furthermore, the present invention is not limited to the above embodiments and can be variously modified at the execution stage without departing from the scope thereof. Moreover, the above-described embodiments include inventions in various stages and various inventions can be extracted by appropriately combining a plurality of disclosed components.

For example, even if several components are omitted from all the components illustrated in each of the above first to third embodiments, a configuration in which the several components are omitted can be extracted as an invention as long as the problem described in the section of Technical Problem can be solved and the effects described in the section of Advantageous Effects of Invention can be obtained. Furthermore, the components in the above-described first to third embodiments may be appropriately combined.

Industrial Applicability

As above, the wire electric discharge machining apparatus according to the present invention is useful for detecting breakage of the wire electrode and particularly suitable for a wire electric discharge machining apparatus that is capable of appropriately detecting breakage even when the wire traveling speed changes transiently or when a speed difference occurs between the rotational components of the wire traveling system.

REFERENCE SIGNS LIST 1 wire electrode
2 workpiece
3 wire bobbin (wire supplying unit)
4, 5, 6, 7, 10 wire guide roller
8a, 8b pinch roller
11a, 11b collecting roller
12, 12a collecting motor
13 tension motor
13a servo motor
14 encoder
15 speed control unit
16 servo amplifier
17 numerical control (NC) unit
18 speed calculating unit
19 speed storing unit
20 differential speed calculating unit
21 breakage-detection-threshold setting unit
22 breakage detecting unit
23 average-moving-speed calculating unit
24 speed variation calculating unit
25 speed variation suppressing unit
100, 200, 300 wire electric discharge machining apparatus

The invention claimed is:

1. A wire electric discharge machining apparatus comprising:
a wire electrode;
a wire supplying unit that supplies the wire electrode;
a collecting motor that collects the wire electrode at a predetermined speed;
a tension motor that controls a tension of the wire electrode between the wire supplying unit and the collecting motor;
a speed calculating unit that calculates a traveling speed at a predetermined location of the wire electrode at a predetermined time interval;
an average-moving-speed calculating unit that calculates an average moving speed of a past traveling speed calculated by the speed calculating unit;
a speed variation calculating unit that calculates a difference between the traveling speed output from the speed calculating unit and the average moving speed as a speed variation;
a breakage detecting unit that detects breakage of the wire electrode by comparing the speed variation with a predetermined threshold, the predetermined threshold being a predetermined speed variation; and
a speed variation suppressing unit that suppresses the speed variation by controlling the tension motor on a basis of the speed variation.

2. The wire electric discharge machining apparatus according to claim 1, wherein the speed variation calculating unit calculates the traveling speed of the wire electrode on a basis of a rotational speed of the tension motor.

3. The wire electric discharge machining apparatus according to claim 1, wherein the speed variation calculating unit calculates the traveling speed of the wire electrode on a basis of a rotational speed of the collecting motor.

4. The wire electric discharge machining apparatus according to claim 1, wherein the speed variation calculating unit calculates a differential speed on a basis of the traveling speed that is two or more samples away in terms of the predetermined time interval.

* * * * *